United States Patent
Johnson et al.

(10) Patent No.: US 6,971,838 B2
(45) Date of Patent: Dec. 6, 2005

(54) BATTERY PLATE FEEDER HAVING LOW VACUUM, HIGH FLOW RATE PICK-UP HEAD

(75) Inventors: David A. Johnson, Corvallis, OR (US); Tobin Knighton, Albany, OR (US)

(73) Assignee: Mitek Holdings, Inc., Chesterfield, MO (US)

( * ) Notice: Subject to any disclaimer, the term of this patent is extended or adjusted under 35 U.S.C. 154(b) by 142 days.

(21) Appl. No.: 10/282,993

(22) Filed: Oct. 28, 2002

(65) Prior Publication Data

US 2004/0081544 A1    Apr. 29, 2004

(51) Int. Cl.[7] .................................................. B65G 3/00

(52) U.S. Cl. ................... 414/796.7; 414/736; 414/737; 414/797

(58) Field of Search .......................... 294/65; 414/736, 414/737, 796.7, 797; 198/418.3; 271/3.01, 271/5, 11–15, 103

(56) References Cited

U.S. PATENT DOCUMENTS

| | | | | |
|---|---|---|---|---|
| 2,704,593 A | * | 3/1955 | Galloway | 198/418.3 |
| 2,790,536 A | * | 4/1957 | Reed | 198/418.3 |
| 4,018,342 A | * | 4/1977 | Cuniberti et al. | 414/737 |
| 4,168,772 A | * | 9/1979 | Eberle | 198/418.3 |
| 4,529,353 A | * | 7/1985 | Dean et al. | 414/404 |
| 4,720,227 A | * | 1/1988 | Eberle | 414/788.4 |
| 4,749,219 A | * | 6/1988 | Bolle et al. | 414/752.1 |
| 4,784,380 A | * | 11/1988 | Eberle | 271/103 |
| 4,787,812 A | * | 11/1988 | Gopfert | 414/737 |
| 5,033,730 A | * | 7/1991 | Davies et al. | 271/106 |

* cited by examiner

*Primary Examiner*—Khoi H. Tran
(74) *Attorney, Agent, or Firm*—Senniger Powers

(57) ABSTRACT

A feeder for porous battery plates has a vacuum-operated pickup head that is positioned above the plates. The pickup head pulls the top plate off of the stack of plates and moves it to an outfeed device. The opening in the pickup head has an area that is at least 50% of the surface area of the plate. The air flow through the opening in the pickup head is at least 200 CFM and the vacuum at the pickup head is less than 7 inches of water.

11 Claims, 6 Drawing Sheets

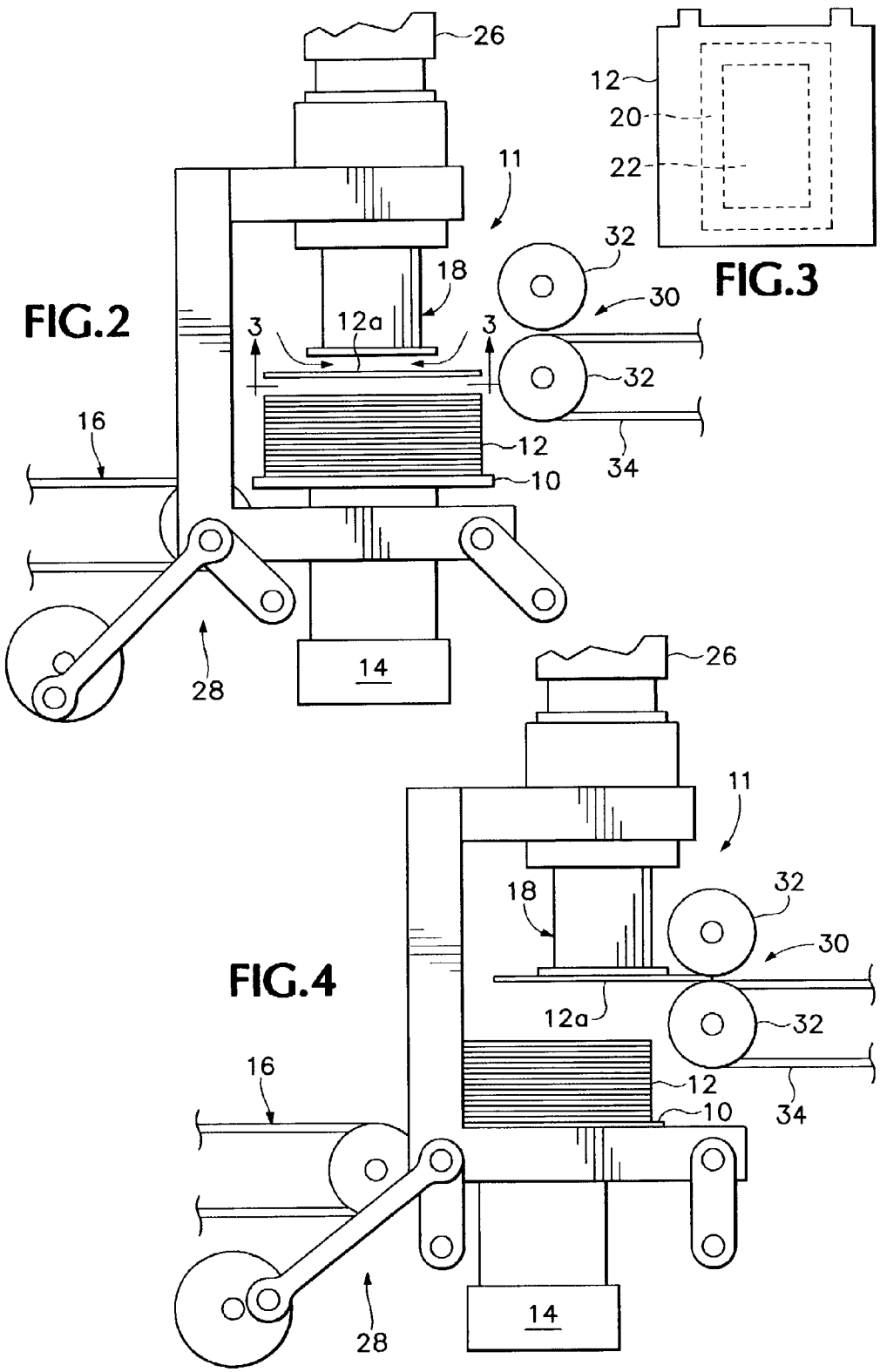

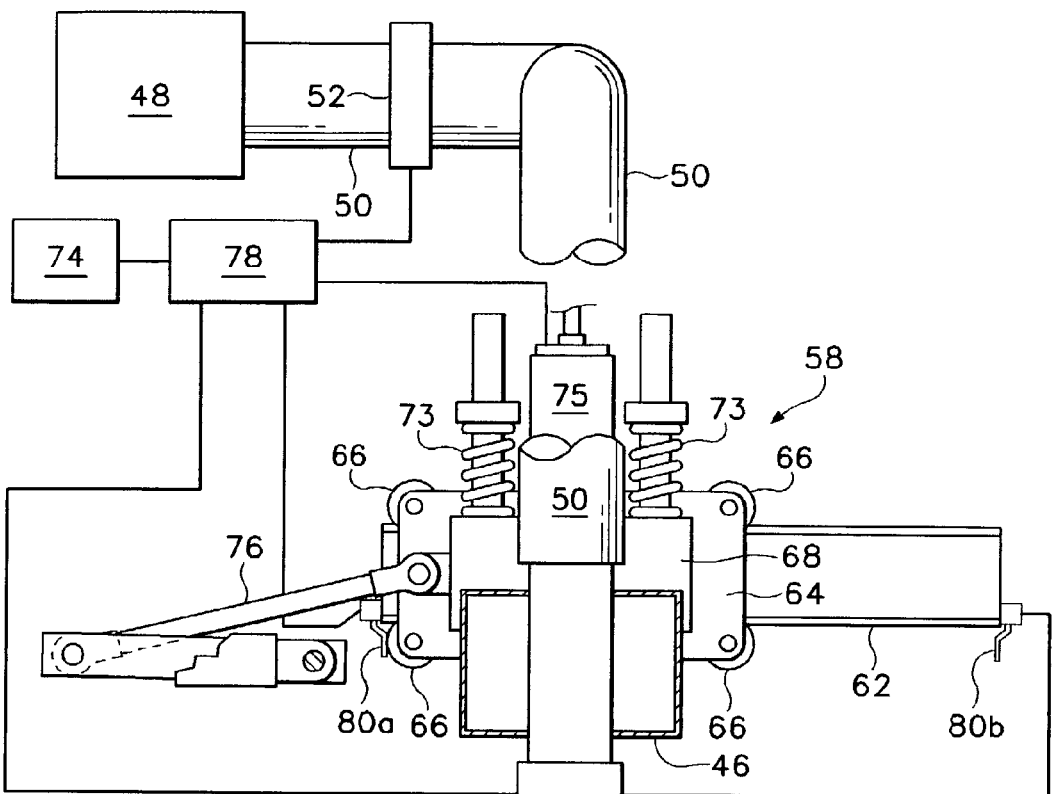
FIG.9
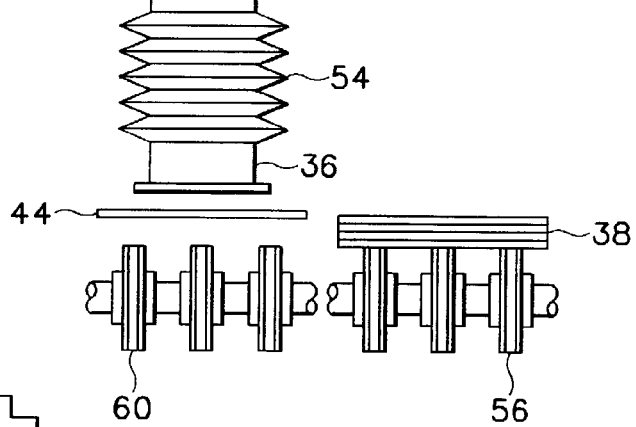
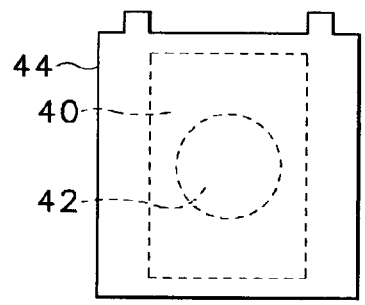
FIG.10

BATTERY PLATE FEEDER HAVING LOW VACUUM, HIGH FLOW RATE PICK-UP HEAD

BACKGROUND AND SUMMARY OF THE INVENTION

The subject invention relates to a feeder which lifts porous battery plates sequentially off of a stack of plates and transports them serially for further processing, and in particular to such a feeder with a pick-up head having a low vacuum and high airflow.

In modern storage batteries, the lead battery plates are encapsulated in a microporous material. The encapsulation process is automated and requires that plates be fed to an encapsulation machine serially. Plate feeders are used to lift individual plates off of a stack of plates and feed them to the encapsulation machine. These plate feeders use a pick-up head which is connected to a vacuum source to lift the plates off of the stack. However, because battery plates are porous, and the porosity varies from plate to plate, if the pickup head is brought into contact with the top plate to pick it up, multiple plates will be picked up. As a result, the pickup head is only brought close to the plates being picked up and the vacuum pulls the top plate away from the stack of plates and up to the pickup head. Historically this has been accomplished by using a pickup head with an opening having an area which is very small relative to the surface area of the plates being picked up and a relatively high vacuum, in the order of several inches of mercury. This small opening results in a relatively low airflow into the pickup head.

In recent years, battery plates have become thinner, and thus far more porous. As a result, it has become more likely that this high vacuum will pass through the top plate and pull the next plate off of the stack also. If the vacuum is reduced, there will be less multiple plate pickups but there will be more cases where no plates are picked up. This problem occurs most often with plates at the highest end of the range of porosity, because these plates are the most difficult to pick up and at the same time are the most likely to have a second plate picked up with them.

The foregoing problem with prior art battery plate feeders is overcome by making the opening in the pickup head have an area which is at least 50% of the surface area of the plates, and providing a much larger airflow through the opening at a much smaller level of vacuum. Preferably the airflow through the opening is at least 200 CFM, and the vacuum is less than 7 inches of water.

In another embodiment of the invention, a plurality of pickup heads are carried on a common frame. Each pickup head has a collapsible device located in it which collapses when the opening to the pickup head is covered by a plate. Thus, the pickup head automatically moves the plate away from the stack without requiring any head lifting mechanism. A transport mechanism moves the pickup head and attached plates to an outfeed device which the plates are deposited on. A feed mechanism places a stack of plates simultaneously under each pickup head with the top plate in each stack being separated from its respective pickup face by a gap which is within a predetermined range.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is a side elevation of the plate feeder of FIG. 1, partially broken away to show hidden detail, with the pickup head at its lowest position where it is picking up a plate.

FIG. 3 is a plan view of a plate being picked up, taken along the line 3—3 of FIG. 2.

FIG. 4 is a side elevational view, partially broken away to show hidden detail, of the plate feeder of FIG. 1 with the pickup head in its fully raised, discharged position.

FIG. 9 is a sectional view, similar to FIG. 8, showing the transport mechanism of the invention in a different location.

FIG. 10 is a plan view of a battery plate attached to the pickup head of the embodiment of the invention shown in FIG. 5.

DETAILED DESCRIPTION OF THE PREFERRED EMBODIMENT

Figure 1:
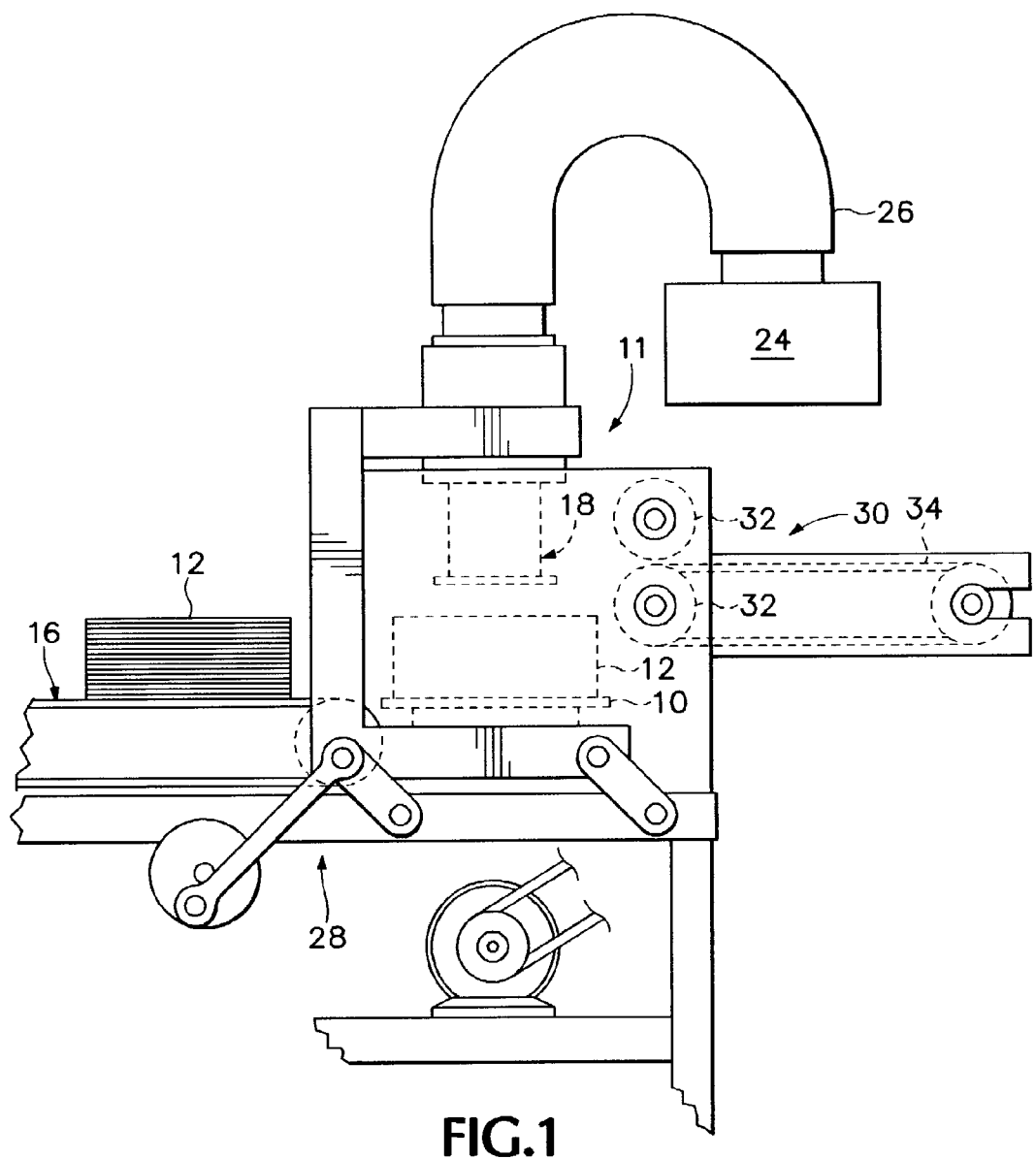
FIG. 1 is a side elevational view of a plate feeder embodying the subject invention.

Referring now to FIGS. 1–4 of the drawings, a plate feed apparatus 11 has a platform 10 which carries a stack of battery plates 12. The plates would normally be oriented horizontally on top of each other, as shown, but they could have other orientations as well. The platform 10 moves vertically and a vertical stack indexing mechanism, shown schematically as 14, raises the stack by an incremental amount each time a plate is removed from the top of the stack. Mechanisms of this type are well known in the feeder art. A mechanism, shown schematically at 16, is also provided to place a new stack of plates on the platform when all of the plates have been removed from the current stack. Mechanisms of this type are well known in the feeder arts also.

Located above the platform 10 is a pickup head 18. The pickup head has a pickup surface 20 with a pickup opening 22 located in it, FIG. 3. While battery plates have varying and unequal thicknesses, the pickup surface is generally parallel with and located over the stack of plates 12. The pickup head is connected to a vacuum source 24 through a vacuum tube 26. The vacuum source 24 draws air into the pickup opening 22 and creates a vacuum at the pickup opening. A pickup mechanism, shown schematically at 28, causes the pickup head to be raised and lowered and moved from side to side, as will be explained more fully later. Mechanisms of this type are well known in the feeder arts also.

Referring now in particular to FIG. 3, in order to prevent two plates from being picked up at the same time, the opening 22 in the pickup head is much larger relative to the plate 12 being picked up than has heretofore been provided. The area of the opening 22 is at least 50% of the surface area of the plate 12. This allows the air flow into the pickup head to be much larger than what occurs in prior art pick-up heads and the vacuum to be much lower. The flow into the pickup head is at least 200 CFM and preferably falls within the range of 200–800 CFM. The vacuum is less than 7 inches of water and preferably is within the range of 2–7 inches of water. Testing has shown that the foregoing levels of vacuum and airflow work well with battery plates having a surface area up to about 56 square inches. While these levels of vacuum and airflow may work for larger plates, it is not known if they will.

While the foregoing vacuum is too low to hold the more porous plates on the pick-up head, combined with the larger air flow it will pick up even the most porous plates. This is because the large air flow causes the vacuum to act over the entire plate area and create a lifting force that is greater than the same level a vacuum would provide if it were only acting over the area of the opening in a pickup head, which occurs with the high vacuum, low flow pickup heads of the prior art. Once the plate is up against the pickup head, the vacuum only works against the portion of the plate covered by the pickup opening. However, when a vacuum inlet is closed the pressure decreases momentarily, and this increased vacuum is sufficient to hold the plate on the pickup head long enough for the plate to be transported to an outfeed mechanism 30.

In operation a low vacuum, high volume flow is provided at the pickup head 18 by the vacuum source 24. The pickup mechanism 28 lowers the pickup head to a point where the air flow acting over the entire face of the plate causes the top plate 12a to be lifted off of the stack and into contact with the pickup head, FIG. 2. The pickup mechanism 28 then lifts the pickup head and translates it sideways toward the outfeed mechanism 30 to where the plate 12a is inserted between the outfeed rollers 32. The outfeed rollers 32 pull the plate 12a off of the pickup head and deposit it onto the outfeed conveyor 34 where it is transported away from the feeder for further processing.

Referring now to FIGS. 1–10, rather than using a single pickup head 18 and raising a single stack of plates 12 upwardly toward the pickup head every time a plate is removed from the stack, a plurality of pickup heads 36a–36e simultaneously remove plates from a like number of stacks 38a–38e. Each pickup head has a pickup face 40, FIG. 10, with a pickup opening 42 having an area relative to the area of the plate 44 that is the same as the opening 22 in the pickup head 18 is to the plate 12. The pickup heads are suspended from a pickup frame 46 in a manner such that their pickup faces are horizontal and lie in a common plane. The pickup heads 36a–36e are connected to a common vacuum source, shown schematically as 48, through a duct system 50, FIG. 9. A valve, shown schematically at 52, allows the vacuum source to be connected to or disconnected from the pickup heads, as will be more fully explained later.

The pickup heads have collapsible devices located in them downstream of the pickup openings. While the collapsible device illustrated in the drawings is a bellows 54, it could be a telescoping pipe section or other device. When a plate 44 is placed into contact with a pickup head, and thus closes the pickup opening, the vacuum at that pickup head will increase. This increased vacuum will cause the collapsible device to collapse and move the pickup face and plate upwardly. Thus the plate is pulled clear of the stack it was removed from automatically without the need for any mechanical lifting mechanism.

Figure 5:
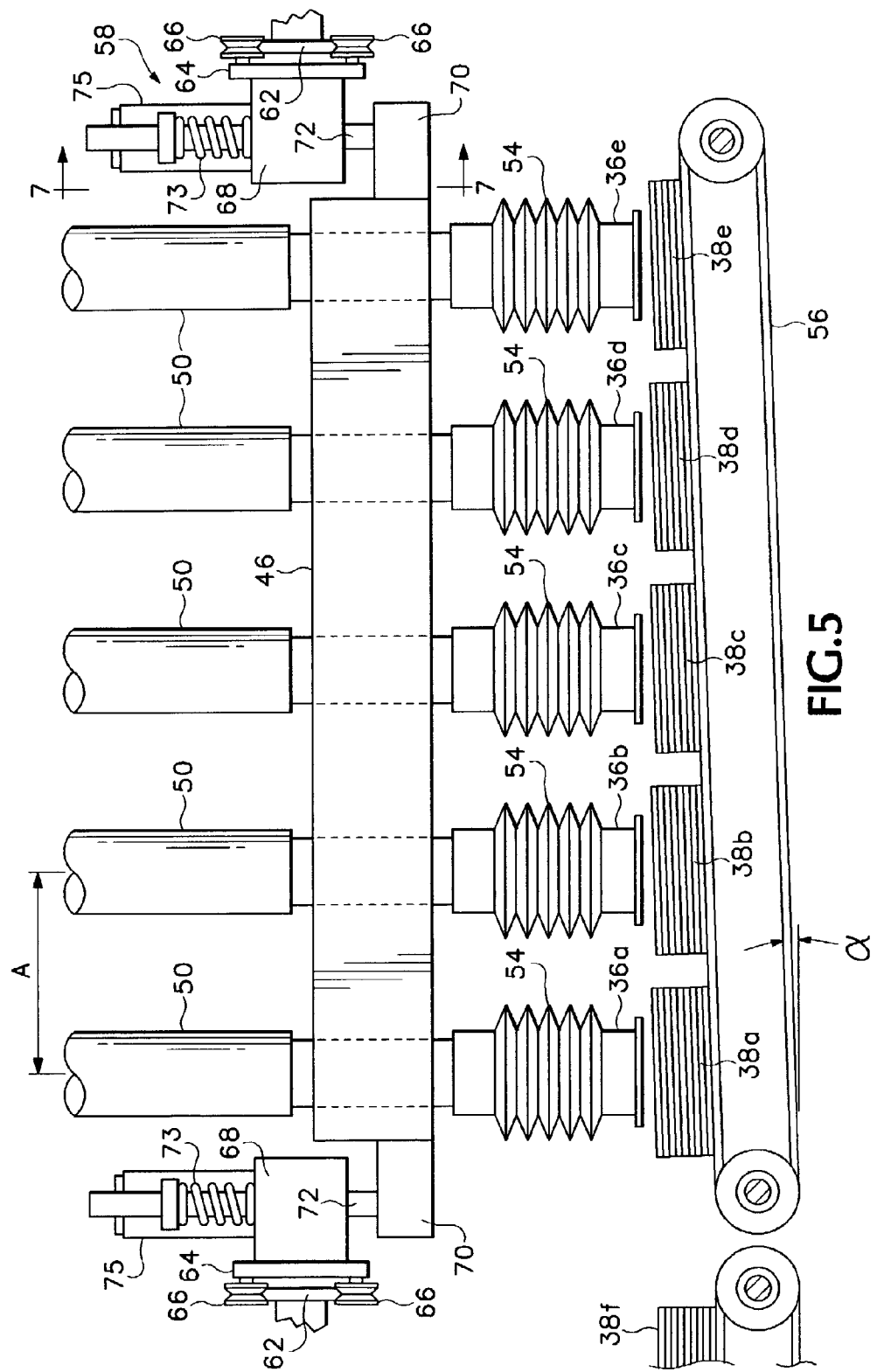
FIG. 5 is fragmentary side elevational view of a plate feeder that is another embodiment of the invention.
Figure 6:
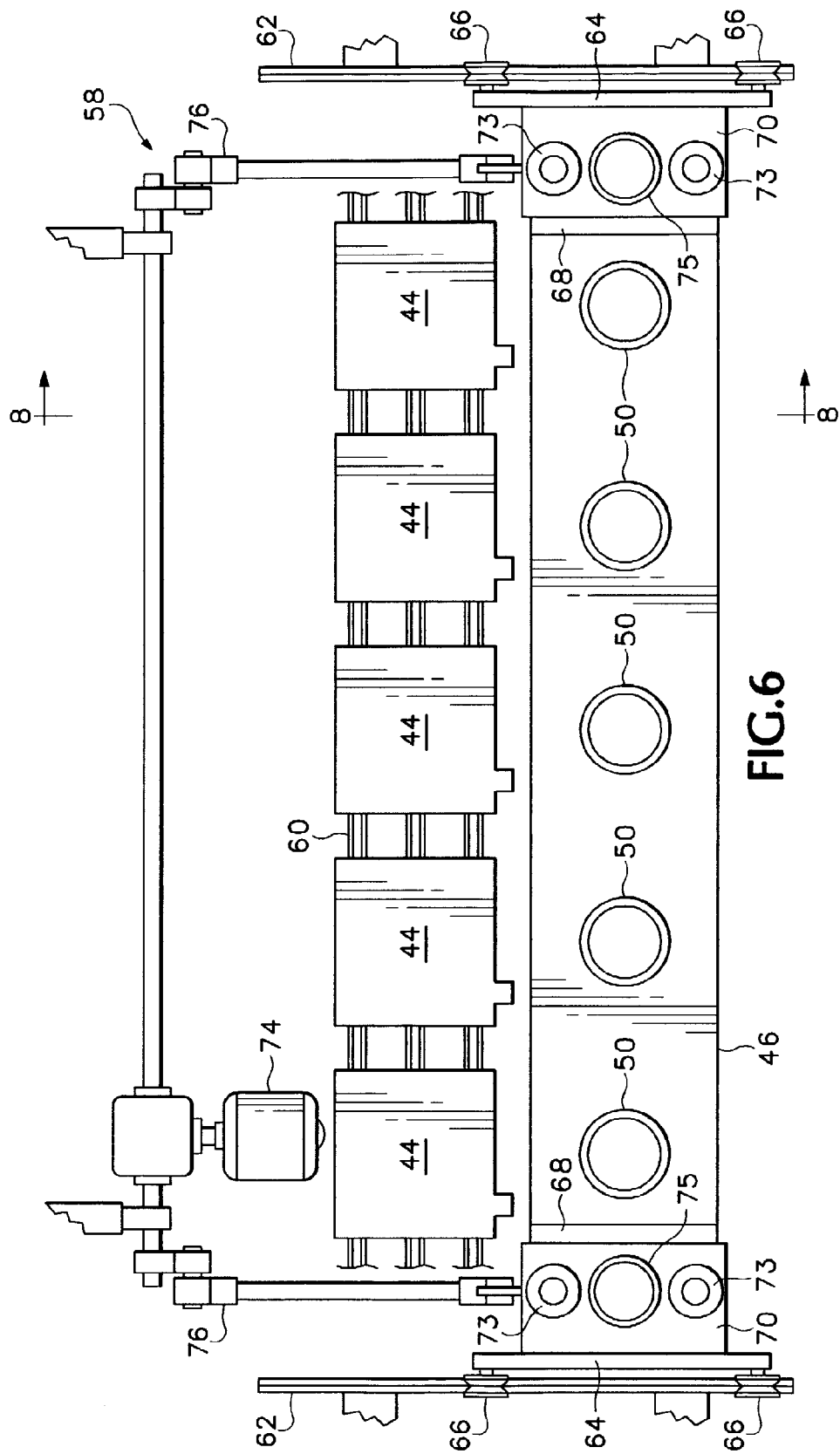
FIG. 6 is a fragmentary plan view of the plate feeder shown in FIG. 5.
Figure 7:
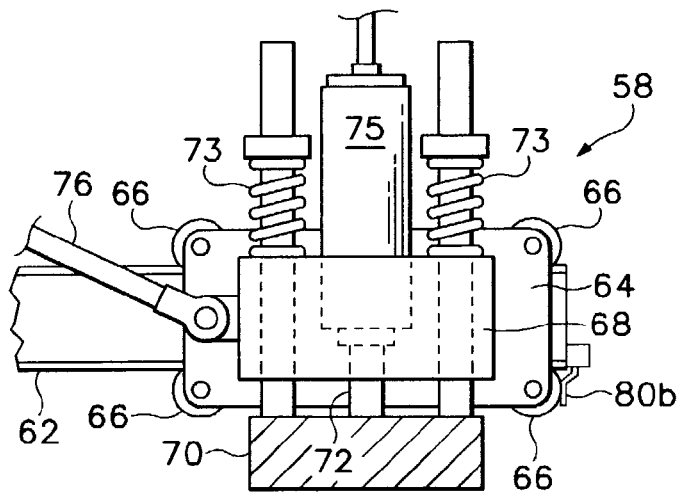
FIG. 7 is a sectional view taken along the line 7—7 of FIG. 5.
Figure 8:
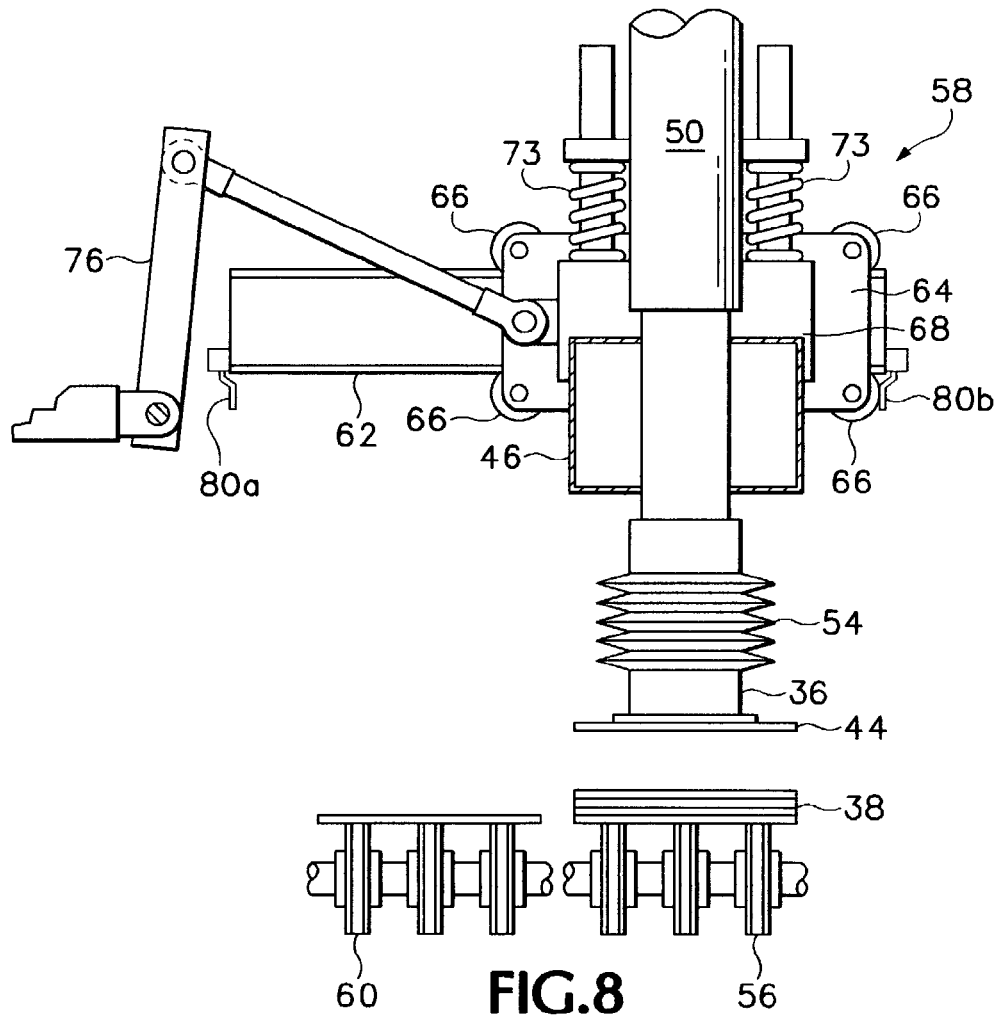
FIG. 8 is a sectional view taken along the line 8—8 of FIG. 6.

In order to eliminate the vertical stack indexing mechanism, the stacks of plates are fed on an infeed conveyor 56 which is oriented at an angle $\alpha$ with respect to the plane of the pickup faces 40. As a practical matter, a pickup head can sequentially pick up several plates from a stack, the exact number depending on the porosity and the weight of the plates. For the remainder of this discussion it will be assumed that a pickup head will sequentially pick up five plates from the same stack. However, for ease of illustration, FIG. 5 shows the angle $\alpha$ such that only one plate will be picked up from each stack. The pickup heads are separated from one another by a distance A, and this distance and the angle $\alpha$ are such that the nominal separation distance between the pickup faces 40 and the top of the infeed conveyor decreases from pickup head to pickup head by an amount equal to roughly the thickness of the number of plates that will be removed from each stack, in this case five plates. Thus if each stack has five less plates than the preceding stack, the distance between the pickup face of each pickup head and the top plate in its respective stack is roughly the same. The thickness of battery plates vary from plate to plate so different stacks with the same number of plates may have different heights. Thus, this distance could vary considerably from stack to stack. With this scenario, the stacks will contain 25 plates, although on start-up, the first stack will contain 5 plates, the second stack 10 plates, the third stack 15 plates, the fourth stack 20 plates and the fifth stack 25. After 5 plates have been removed from each stack the infeed conveyor is activated to move the stacks a distance equal to the pickup head separation distance A.

Referring now also to FIGS. 6–9, a transport mechanism 58 allows the frame 46 to be moved in a direction normal to the direction of the infeed conveyor 56. Thus, each time plates are picked up by the pickup heads the frame is moved from a pickup position over the infeed conveyor, shown in FIGS. 5, 6 and 8, to a deposit position over an outfeed conveyor 60, which is parallel with the infeed conveyor 56.

The embodiment of the transport mechanism 58 shown in the drawings includes a pair of guiderails 62, located outwardly of each end of the frame 46, which extend across the infeed conveyor 56 and the outfeed conveyor 60. A trolley 64 is attached movably to each guiderail 62 by means of pairs of upper and lower rollers 66. A platform 68, which is attached to each trolley 64, is attached to a mount 70 which in turn is attached to one end of the frame 46. This allows the frame 46 to be moved between its pickup position, over the infeed conveyor 56, and its deposit position, over the outfeed conveyor 60, by moving the trolleys 64 along the guiderails 62.

Each platform 68 is attached to its mount 70 through the piston 72 of a pneumatic cylinder 75. This allows the frame to be raised as the pickup heads are moved between their pickup and deposit positions to clear the structure which supports the infeed and outfeed conveyors. Spring dampers 73 or shock absorbers cushion the frame as it is being lowered. Movement of the trolleys back and forth along the guiderails is accomplished by means of an electric motor 74 which operates through an appropriate rotary-to-linear reciprocating linkage 76.

A microprocessor controller 78 is connected to the motor 74, the pneumatic cylinder 75, the vacuum valve 52 and limit switches 80a and 80b located at each end of one of the guiderails 62 to control the operation of the apparatus as follows. Assuming that five plates will be picked up by each pickup head 36a–36e from each stack 38a–38e, the process is started by placing on the infeed conveyor 25 plates in stack 38a under pickup head 36a, 20 plates in stack 38b under pickup head 36b, 15 plates in stack 38c under pickup head 36c, 10 plates in stack 38d under pickup head 36d and 5 plates in stack 38e under pickup head 36e. The controller then causes the valve 52 to open thereby providing vacuum to all 5 pickup heads. This causes the top plate 44 to be pulled off of each stack and into contact with the respective pickup face 40, FIG. 8. The controller 78 then causes the motor 74 to move the trolleys 68 along the guiderails 62 to the deposit position, FIG. 9, where one of the trolleys engages the limit switch 80a. The controller then stops the motor 74 and closes the valve 52, which causes the plates 44 to drop from the pickup heads onto the outfeed conveyor 60, where they are transported out of the apparatus. The controller then restarts the motor 78 and the trolleys 68 are moved back to the pickup position, where one of the trolleys engages the limit switch 80b. This causes the controller to stop the motor and open the valve 52 to initiate vacuum flow again in the pickup heads. The second plate in each stack is then picked up and the process is repeated.

After the desired number of plates have been picked up, 5 in the example being discussed, the infeed conveyor 56 is activated to move the four remaining stacks downstream a distance equal to the pickup head separation distance A. Thus, stack 38d, which now contains five plates, is placed under pickup head 36e, stack 38c, which now contains 10 plates, is placed under pickup head 36d, stack 38b, which now contains 15 plates, is placed under pickup head 36c and stack 38a, which now contains 20 plates, is placed under pickup head 36b. Simultaneously the controller activates a supply conveyor which places a new stack 38f of 25 plates on the infeed conveyor 56 so that this stack will be located under pickup head 36a. The entire process is then repeated.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A feeder for removing porous battery plates having a predetermined plate thickness from a stack of plates and depositing them serially on an outfeed device for further processing, comprising:
    a pickup frame;
    a plurality of pickup heads carried by said pickup frame;
    each said pickup head having a pickup face with a pickup opening having a predetermined opening area defined therein, said pickup faces lying in a common plane;
    a vacuum source which provides a predetermined level of vacuum at said pickup openings;
    a collapsible device associated with each pickup head, the collapsible device being adapted to collapse by operation of a temporarily increased vacuum acting on the collapsible device to raise the pickup face of said pickup head;
    a feed mechanism comprising an infeed conveyor oriented at a conveyor angle with respect to the common plane of said pickup faces for simultaneously placing a stack of plates under each of said pickup heads with the top plate in each stack being separated from its respective pickup face by a gap which is within a predetermined range, said gap being generally the same for all of said pickup heads;
    a transport mechanism for moving said pickup frame between a pickup position where said pickup heads are above said stacks of plates and a deposit position where said pickup heads are above said outfeed device;
    a valve associated with said vacuum source which connects said vacuum source to said pickup heads when said pickup frame is moved to said pickup position and disconnects said vacuum source from said pickup heads when said pickup frame is moved to said deposit position;
    said gap is such that when said vacuum source is connected to said pickup heads and said pickup frame is in its pickup position the top plate in each stack will be lifted off of said stack and pulled into contact with the respective pickup face.

2. The feeder of claim 1 wherein said vacuum source and said predetermined opening area are sized such that a vacuum of less than 7 inches of water and an air flow of more than 200 CFM is created at said pickup openings.

3. The feeder of claim 1 wherein said battery plate has a predetermined surface area and said opening area is at least 50% of said surface area.

4. The feeder of claim 2 wherein said battery plate has a predetermined surface Area and said opening area is at least 50% of said surface area.

5. The feeder of claim 1 wherein the vacuum created at said opening is between 2 inches of water and 7 inches of water.

6. The feeder of claim 1 wherein the air flow created at said opening is between 200 CFM and 800 CFM.

7. The feeder of claim 1 wherein each said pickup head is separated from each adjacent pickup head by a predetermined separation distance and said separation distance and said conveyor angle are such that the spacing distance between the pickup face of each pickup head and said conveyor is less than the spacing distance of a preceding pickup head by an amount equal to the nominal thickness of a predetermined number of said plates.

8. The feeder of claim 1 wherein said collapsible device is a bellows.

9. A feeder for removing porous plates from a stack of plates and depositing them serially on an outfeed device for further processing, comprising:
    a frame;
    a plurality of heads carried by said frame, each head having a face with an opening therein, each said opening having an opening area;
    a vacuum source;
    a feed mechanism for simultaneously placing a stack of plates under each of said heads;
    a transport mechanism for moving said frame between a pickup position where said heads are above said stacks of plates and a deposit position where said heads are above said outfeed device;
    a valve associated with said vacuum source for connecting said vacuum source to said heads when said frame is moved to said pickup position and for disconnecting said vacuum source from said heads when said frame is moved to said deposit position; and
    the vacuum source and the opening areas being sized such that a vacuum of less than 7 inches of water and an air flow of more than 200 CFM is created at each said opening.

10. A feeder for removing porous battery plates having a predetermined plate thickness from a stack of plates and depositing them serially on an outfeed device for further processing, comprising:
    a pickup frame;
    a plurality of pickup heads carried by said pickup frame;
    each said pickup head having a pickup face with a pickup opening having a predetermined opening area defined therein;
    a vacuum source which provides a predetermined level of vacuum at said pickup openings, said vacuum being between 2 inches of water and 7 inches of water;
    a collapsible device associated with each pickup head, the collapsible device being adapted to collapse by operation of a temporarily increased vacuum acting on the collapsible device to raise the pickup face of said pickup head;

a feed mechanism for simultaneously placing a stack of plates under each of said pickup heads with the top plate in each stack being separated from its respective pickup face by a gap which is within a predetermined range;

a transport mechanism for moving said pickup frame between a pickup positicion where said pickup heads are above said stacks of plates and a deposit position where said pickup heads are above said outfeed device;

a valve associated with said vacuum source which connects said vacuum source to said pickup heads when said pickup frame is moved to said pickup position and disconnects said vacuum source from said pickup heads when said pickup frame is moved to said deposit position;

the gap is such that when said vacuum source is connected to said pickup heads and said pickup frame is in its pickup position the top plate in each stack will be lifted off of said stack and pulled into contact with the respective pickup face.

11. A feeder for removing porous battery plates having a predetermined plate thickness from a stack of plates and depositing them serially on an outfeed device for further processing, comprising:

a pickup frame;

a plurality of pickup heads carried by said pickup frame;

each said pickup head having a pickup face with a pickup opening having a predetermined opening area defined therein;

a vacuum source which provides a predetermined level of vacuum at said pickup openings, the air flow created at said pickup openings being between 200 CFM and 800 CFM;

a collapsible device associated with each pickup head, the collapsible device being adapted to collapse by operation of a temporarily increased vacuum acting on the collapsible device to raise the pickup face of said pickup head;

a feed mechanism for simultaneously placing a stack of plates under each of said pickup heads with the top plate in each stack being separated from its respective pickup face by a gap which is within a predetermined range;

a transport mechanism for moving said pickup frame between a pickup position where said pickup heads are above said stacks of plates and a deposit position where said pickup heads are above said outfeed device;

a valve associated with said vacuum source which connects said vacuum source to said pickup heads when said pickup frame is moved to said pickup position and disconnects said vacuum source from said Pickup heads when said pickup frame is moved to said deposit position;

said gap is such that when said vacuum source is connected to said pickup heads and said pickup frame is in its pickup position the top plate in each stack will be lifted off of said stack and pulled into contact with the respective pickup face.

* * * * *